United States Patent
Yamano

(10) Patent No.: US 10,627,953 B2
(45) Date of Patent: Apr. 21, 2020

(54) INFORMATION PROCESSING APPARATUS, PROGRAM, AND INFORMATION PROCESSING SYSTEM

(71) Applicant: SONY CORPORATION, Tokyo (JP)

(72) Inventor: Ikuo Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/318,587

(22) PCT Filed: Jul. 10, 2017

(86) PCT No.: PCT/JP2017/025065
§ 371 (c)(1),
(2) Date: Jan. 17, 2019

(87) PCT Pub. No.: WO2018/037738
PCT Pub. Date: Mar. 1, 2018

(65) Prior Publication Data
US 2019/0286322 A1    Sep. 19, 2019

(30) Foreign Application Priority Data
Aug. 24, 2016  (JP) .................... 2016-163719

(51) Int. Cl.
*G06F 3/041*    (2006.01)
*G06F 3/0485*   (2013.01)
*G06F 3/0354*   (2013.01)

(52) U.S. Cl.
CPC ...... *G06F 3/041661* (2019.05); *G06F 3/0354* (2013.01); *G06F 3/041* (2013.01); *G06F 3/0485* (2013.01); *G06F 3/04186* (2019.05); *G06F 3/04855* (2013.01)

(58) Field of Classification Search
CPC .......... G06F 3/041661; G06F 3/04186; G06F 3/04855
See application file for complete search history.

(56) References Cited

U.S. PATENT DOCUMENTS 9,280,207 B2 *  3/2016  Graumann ............ B62D 1/046

* cited by examiner

*Primary Examiner* — Charles V Hicks
(74) *Attorney, Agent, or Firm* — Paratus Law Group, PLLC

(57) ABSTRACT

There is provided an information processing apparatus to improve operability regarding applications running in an information processing apparatus. The information processing apparatus includes: a detection unit that has a detection area for detecting a position of a contact body; and a control information generation unit that generates control information regarding an application. The detection area includes an uncontrol area for preventing the application from being controlled when the contact body comes into contact, and the control information generation unit generates the control information regarding the application on the basis of a positional relation between the uncontrol area and a position of the contact body detected by the detection unit in the detection area.

20 Claims, 19 Drawing Sheets

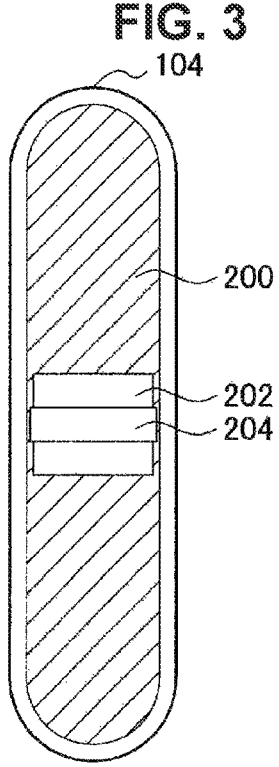
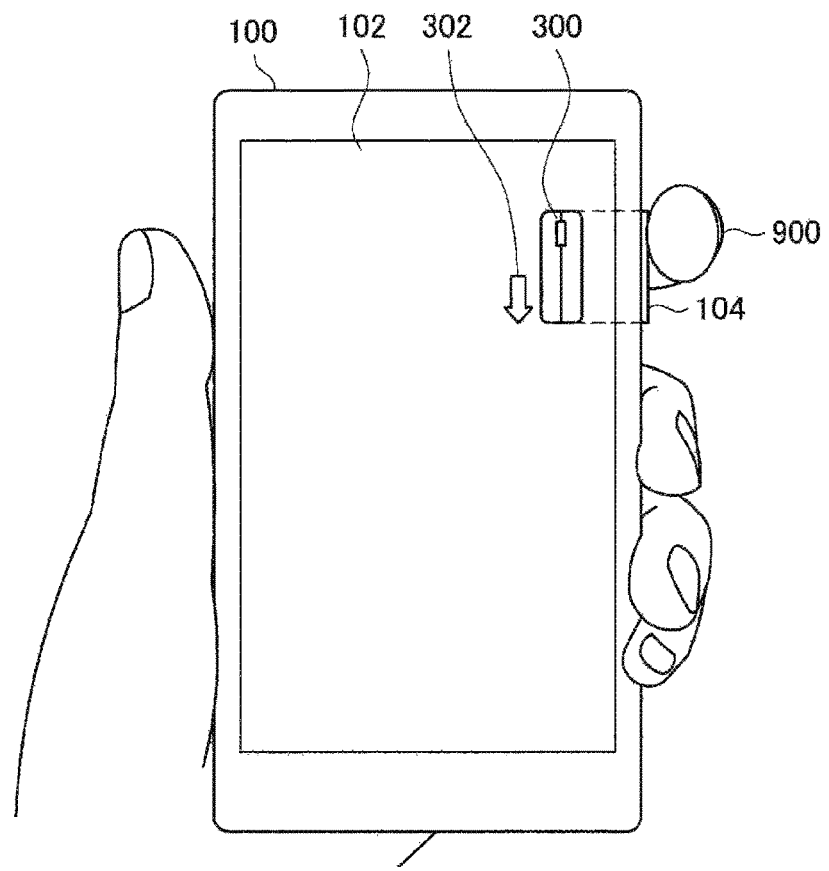

INFORMATION PROCESSING APPARATUS, PROGRAM, AND INFORMATION PROCESSING SYSTEM

CROSS REFERENCE TO PRIOR APPLICATION

This application is a National Stage Patent Application of PCT International Patent Application No. PCT/JP2017/025065 (filed on Jul. 10, 2017) under 35 U.S.C. § 371, which claims priority to Japanese Patent Application No. 2016-163719 (filed on Aug. 24, 2016), which are all hereby incorporated by reference in their entirety.

TECHNICAL FIELD

The present disclosure relates to an information processing apparatus, a program, and an information processing system.

BACKGROUND ART

Currently, there are various kinds of methods for operating equipment. The methods for operating equipment include a remote control that transmits operation information to equipment when a user pushes a hardware key (physical key), for example. In addition, in recent years, there are methods in which a user performs operation through a touchscreen. The touchscreen is provided on an information processing apparatus such as a smartphone. The user uses operation methods such as a flick and swipe to operate an application running in the information processing apparatus.

Patent Literature 1 discloses an operation method using a touchscreen. According to the invention disclosed by Patent Literature 1, scrolling operation and enlarging/reducing operation are performed when a user performs operation starting from a position within a predetermined area. In addition, one of the scrolling operation and the enlarging/reducing operation is performed when the user performs operation starting from a position outside the predetermined area.

CITATION LIST

Patent Literature

Patent Literature 1: JP 2010-266961A

DISCLOSURE OF INVENTION

Technical Problem

Various kinds of applications are executed in the current information processing apparatuses. Therefore, the present disclosure proposes an operation method with high operability regarding applications running in the information processing apparatus.

Solution to Problem

According to the present disclosure, there is provided an information processing apparatus including: a detection unit that has a detection area for detecting a position of a contact body; and a control information generation unit that generates control information regarding an application. The detection area includes an uncontrol area for preventing the application from being controlled when the contact body comes into contact, and the control information generation unit generates the control information regarding the application on the basis of a positional relation between the uncontrol area and a position of the contact body detected by the detection unit in the detection area.

In addition, according to the present disclosure, there is provided a program causing; a detection unit that has a detection area to detect a position of a contact body; and a control information generation unit to generate control information regarding an application. The detection area includes an uncontrol area for preventing the application from being controlled when the contact body comes into contact, and the program causes the control information generation unit to generate the control information regarding the application on the basis of a positional relation between the uncontrol area and a position of the contact body detected by the detection unit in the detection area.

In addition, according to the present disclosure, there is provided an information processing system including: a detection unit that has a detection area for detecting a position of a contact body; and a control information generation unit that generates control information regarding an application. The detection area includes an uncontrol area for preventing the application from being controlled when the contact body comes into contact, and the control information generation unit generates the control information regarding the application on the basis of a positional relation between the uncontrol area and a position of the contact body detected by the detection unit in the detection area.

Advantageous Effects of Invention

As described above, according to the present disclosure, it is possible for a user to use operation methods with high operability to operate applications.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3 is a diagram illustrating an example of a fingerprint sensor that is an example of a detection unit according to the embodiment of the present disclosure.

FIG. 4 is a diagram illustrating a display example of positional display that is displayed on the information processing apparatus according to the embodiment of the present disclosure.

MODE(S) FOR CARRYING OUT THE INVENTION

Figure 1:
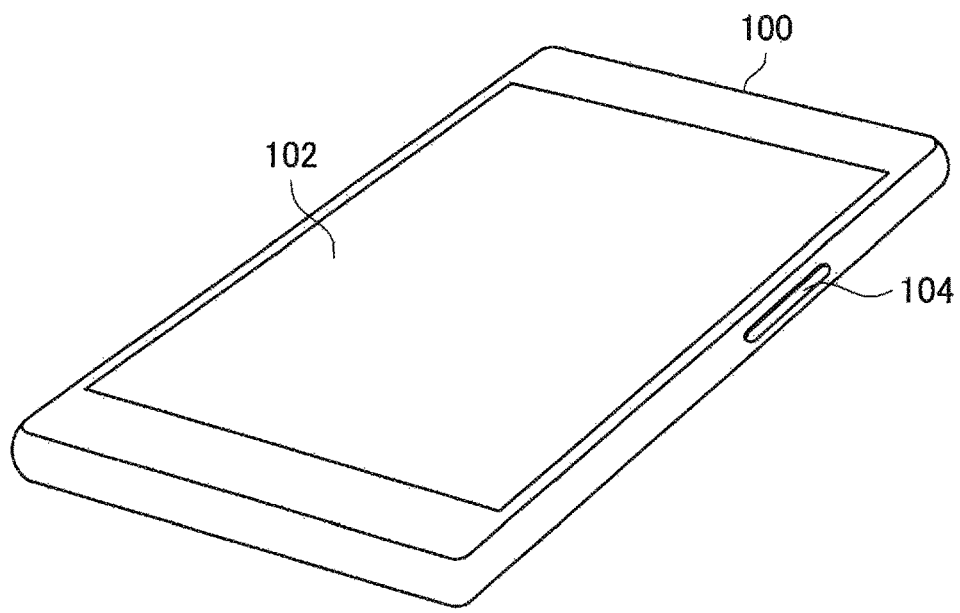
FIG. 1 is a diagram illustrating an example of appearance of an information processing apparatus according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.
1. Configuration example of information processing apparatus
2. Display for assisting user operation
3. Operation method in information processing apparatus
4. Process example in information processing apparatus
5. Another configuration of information processing apparatus
5-1. Feedback using vibration device
5-2. Detection of movement of detection point in lateral direction (short side direction)
5-3. Example in which fingerprint sensor has circular shape
6. Another configuration example of information processing apparatus
7. Supplement
8. Conclusion 1. Configuration Example of Information Processing Apparatus According to Present Disclosure FIG. 1 is a diagram illustrating appearance of an information processing apparatus 100 according to an embodiment of the present disclosure. For example, the information processing apparatus 100 according to the embodiment of the present disclosure may be a mobile terminal that executes various kinds of applications such as a smartphone illustrated in FIG. 1.

As illustrated in FIG. 1, the information processing terminal includes a display unit 102 and a fingerprint sensor 104. The display unit 102 displays information regarding applications running in the information processing apparatus 100. Note that, the display unit 102 may be a liquid crystal display or an organic electro-luminescence (EL) display.

The fingerprint sensor 104 is an example of a detection unit that detects a contact body such as a finger. The fingerprint sensor 104 according to the present embodiment is provided on a side surface of the information processing apparatus 100. For example, the fingerprint sensor 104 may be a capacitive fingerprint sensor 104 that includes electrodes and detects change in electric charges of the electrodes. Such a capacitive fingerprint sensor 104 detects a fingerprint on the basis of amounts of the electric charges retained in the electrodes due to unevenness of the fingerprint.

In addition, the fingerprint sensor 104 is capable of detecting the position of the finger that is the contact body. For example, the fingerprint sensor 104 may detect a range of the contact body such as the finger that is in contact with the fingerprint sensor 104, calculate a center of gravity or the like in the range of the finger that is in contact with the fingerprint sensor 104, and detect the position of the finger. The information processing apparatus 100 according to the present disclosure detects the position of the finger that is the contact body by using the fingerprint sensor 104, and controls an application on the basis of the detected position of the finger. Note that, the fingerprint sensor 104 may be a hardware key (physical key). In addition, the fingerprint sensor 104 may be pushable. As described above, the present disclosure may achieve the function of detecting a position of a contact body on the basis of functions of the existing physical key. As described above, by using the fingerprint sensor 104, it is possible to achieve an operation method according to the present disclosure without installing a new physical key in the information processing apparatus 100 that has only a limited space for installing the physical key such as the smartphone.

Figure 2:
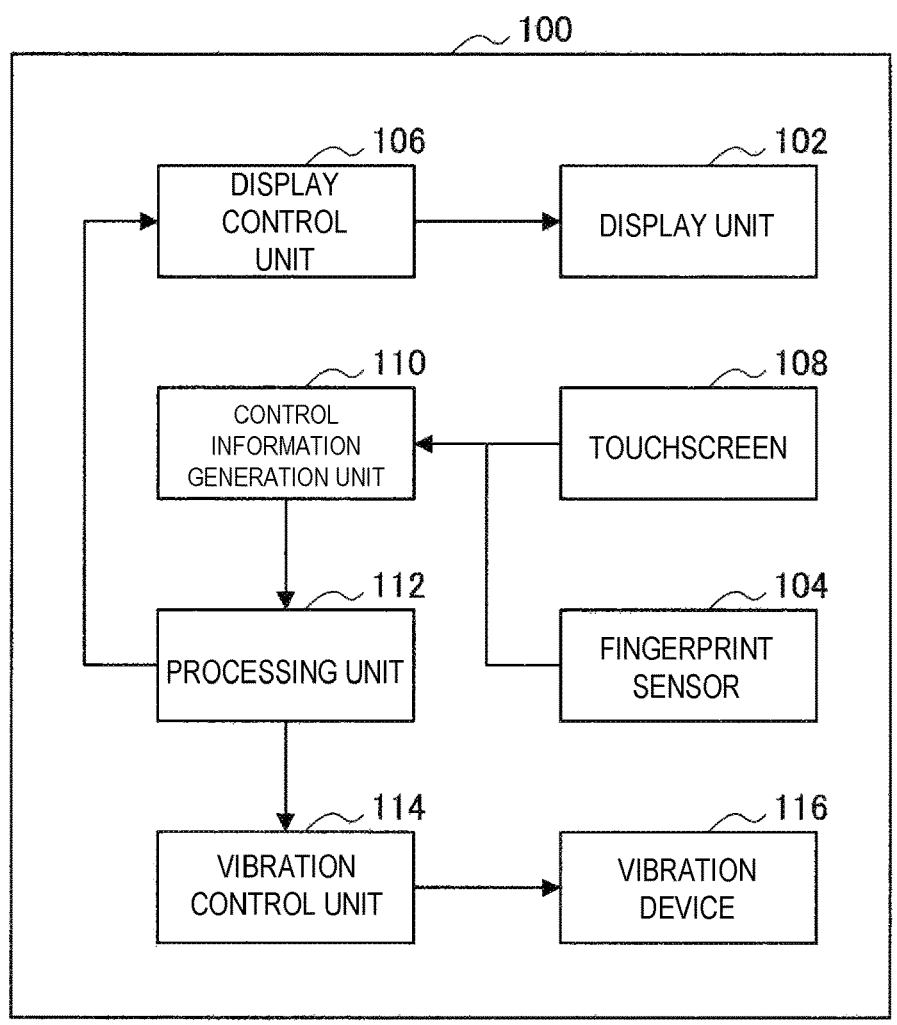
FIG. 2 is a block diagram illustrating an example of a configuration of the information processing apparatus according to the embodiment of the present disclosure.

With reference to FIG. 1, the appearance of the information processing apparatus 100 according to the present disclosure has been described above. Next, an internal configuration of the information processing apparatus 100 will be described. As illustrated in FIG. 2, the information processing apparatus 100 according to the present disclosure further includes a display control unit 106, a touchscreen 108, a control information generation unit 110, a processing unit 112, a vibration control unit 114, and a vibration device 116.

The display control unit 106 generates a display signal for causing the display unit 102 to display an image. For example, the display control unit 106 may generate a display signal regarding an operation screen of an application or a still image and a moving image that are to be reproduced by the application. The display control unit 106 sends the generated display signal to the display unit 102, and the display unit 102 displays an image on the basis of the received display signal.

The touchscreen 108 is used by the user to operate the application running in the information processing apparatus 100. The touchscreen 108 may be externally attached on the liquid crystal display or the organic EL display, or may be integrated with the liquid crystal display or the organic EL display.

The control information generation unit 110 generates control information for controlling the application on the basis of the signal sent from the touchscreen 108 or the fingerprint sensor 104, and transmits the control information to the processing unit 112.

The processing unit 112 connects with the respective units of the information processing apparatus 100 and executes various kinds of processes. For example, the processing unit 112 executes the application included in the information processing apparatus 100. The application included in the information processing apparatus 100 may be an application regarding e-mail, short message, a social networking service, browsing, photography, music reproduction, map display, or the like, for example. In addition, the processing unit 112 generates image data to be displayed on the display unit 102 and sends the image data to the display control unit 106. In addition, the processing unit 112 receives the control information regarding the application from the control information generation unit 110, and controls the application on the basis of the control information.

The vibration control unit 114 generates a vibration signal for controlling the vibration device 116. The vibration device 116 may be an eccentric motor in which a weight is attached to a rotating shaft of the motor, the weight having an uneven shape. In addition, the vibration device 116 may be a voice coil motor, a piezo actuator, or an electromagnetic linear actuator. In this case, the vibration control unit 114 may generate a sound signal, send the sound signal to the vibration device 116, and activate the vibration device 116.

The internal configuration of the information processing apparatus 100 has been described above. Next, a configuration of the fingerprint sensor 104 that is an example of the detection unit according to the present disclosure will be described. FIG. 3 is a diagram illustrating the configuration of the fingerprint sensor 104. The fingerprint sensor 104 according to the present disclosure includes a detection area 200 for detecting the contact body such as a finger. The detection area 200 is formed by providing the fingerprint sensor 104 with the capacitive sensor as described above. Note that, to simplify the description, the detection area 200 is formed as a part of the fingerprint sensor 104 in FIG. 3. However, the detection area 200 may be formed all over the fingerprint sensor 104. In addition, the detection area 200 includes an uncontrol area 202 for preventing an application from being controlled. Note that, as illustrated in FIG. 3, the uncontrol area 202 may be provided near the center of the detection area 200. In addition, the fingerprint sensor 104 according to the present disclosure includes a central part 204 that indicates the center of the detection area 200.

Details of the uncontrol area 202 will be described. For example, in the case where a user is scrolling a screen, the scrolling of the screen stops when the user touches the uncontrol area 202 with his/her finger. Here, any method can be used as the method for preventing the application from being controlled by using the uncontrol area 202.

For example, when the fingerprint sensor 104 detects that a finger of the user has touched the uncontrol area 202, the control information generation unit 110 may stop sending control information to the processing unit 112. The processing unit 112 may stop controlling the application when recognizing that the control information generation unit 110 has not sent the control information. In addition, the control information generation unit 110 may clearly send the control information to the processing unit 112, the control information instructing to stop controlling the application. The processing unit 112 may stop controlling the application when receiving the control information from the control information generation unit 110, the control information instructing to stop controlling the application.

2. Display for Assisting User Operation

The configuration of the information processing apparatus 100 according to the present disclosure and the configuration of the fingerprint sensor 104 included in the information processing apparatus 100 have been described above. Next, display for assisting user operation will be described.

Figure 5:
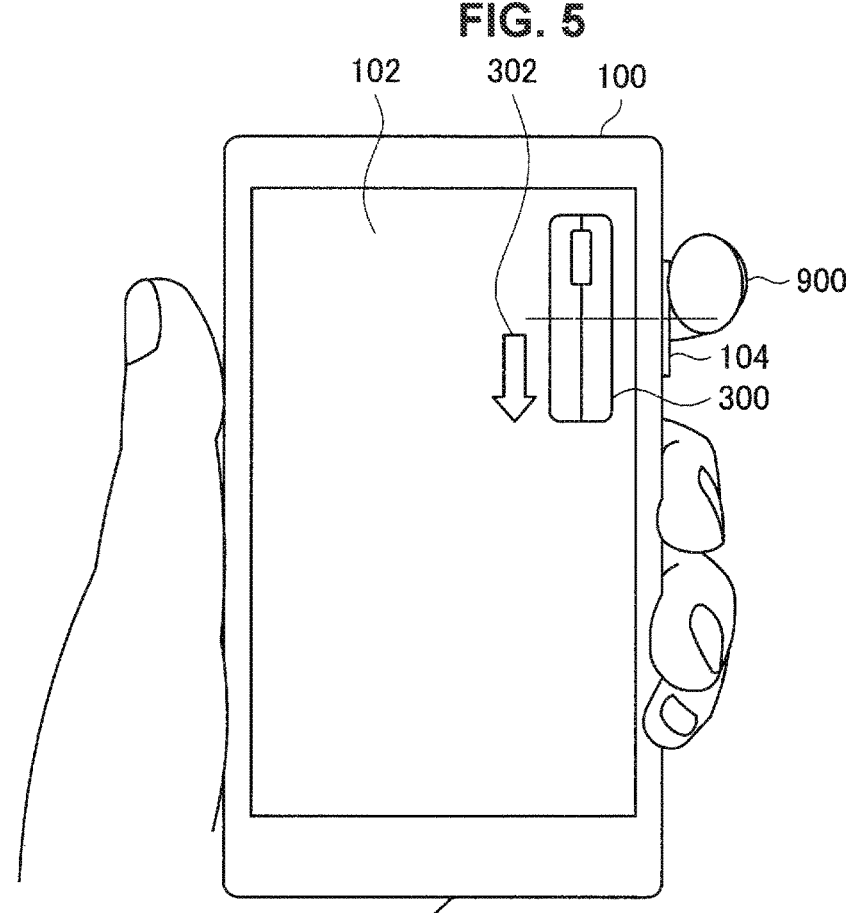
FIG. 5 is a diagram illustrating a display example of positional display that is displayed on the information processing apparatus according to the embodiment of the present disclosure.

FIG. 4 is a diagram in which a user holds the information processing apparatus 100 according to the present disclosure. As illustrated in FIG. 4, when the user touches the fingerprint sensor 104 with his/her finger 900 (index finger in FIG. 4), positional display 300 is displayed. The positional display 300 indicates which part of the fingerprint sensor 104 the user is touching. As represented by the dashed line illustrated in FIG. 4, the positional display 300 is preferably displayed at a size and position that correspond to the fingerprint sensor 104. According to such a configuration, it is possible for the user to intuitively recognize which position of the fingerprint sensor 104 the finger 900 is located at. In addition, as illustrated in FIG. 5, the positional display 300 may be displayed at a size larger than the fingerprint sensor 104. In this case, as represented by the dashed-dotted line illustrated in FIG. 5, the positional display 300 may be displayed such that the center position of the positional display 300 matches the center position of the fingerprint sensor 104. According to such a configuration, it is possible for the user to perform operation without a feeling of strangeness in the case where the uncontrol area 202 is provided near the center of the fingerprint sensor 104.

In addition, assistive display 302 is displayed near the positional display 300 (a left lateral side of the positional display 300 in FIG. 4 and FIG. 5) for assisting user operation. The assistive display 302 is displayed for indicating which direction the user should move his/her finger in. For example, in FIG. 4 and FIG. 5, a downward arrow is displayed as the assistive display 302 for indicating that the user should move the finger 900 in a downward direction. As described above, display of the assistive display 302 enables the user to operate the application more easily.

Figure 6:
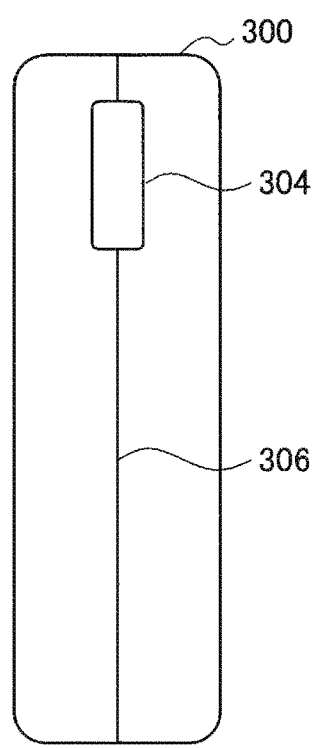
FIG. 6 is a diagram illustrating a display example of positional display that is displayed on the information processing apparatus according to the embodiment of the present disclosure.

Next, details of the configuration of the positional display 300 will be described with reference to FIG. 6. As illustrated in FIG. 6, the positional display 300 includes a cursor 304 and a center line 306. The cursor 304 indicates a position of the fingerprint sensor 104 touched by the user, and the center line 306 indicates the center of the positional display 300. The center line 306 of the positional display 300 corresponds to the center line of the detection area 200 of the fingerprint sensor 104.

3. Operation Method in Information Processing Apparatus

The positional display 300 and the assistive display 302 that are displayed for facilitating operation on the application according to the present disclosure, have been described above. Next, a method of operation using the fingerprint sensor 104 will be described. Note that, hereinafter, an operation method performed in the case where a user performs scrolling operation in an application that displays an image, will be described.

Figure 7:
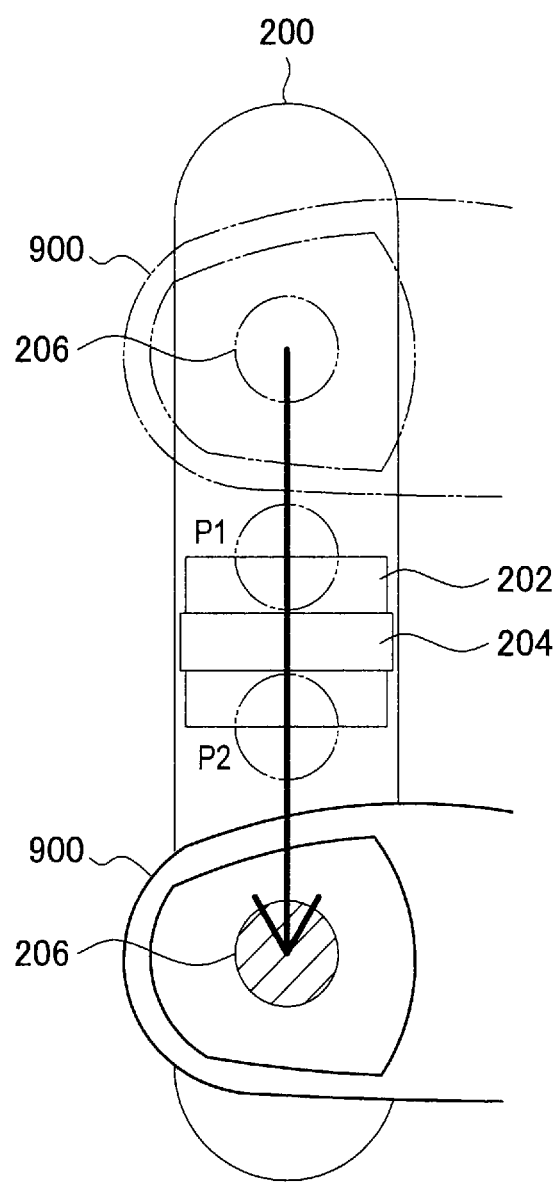
FIG. 7 is a diagram illustrating an example of an operation method of the information processing apparatus according to the embodiment of the present disclosure.

When the user touches the fingerprint sensor 104 as illustrated in FIG. 7, a detection point 206 is detected. The detection point 206 is recognized as the position of the finger 900 in the detection area 200. As described above, it is also possible to detect the detection point 206 by calculating a center of gravity in a range of the finger 900 that is in contact with the detection area 20X). Note that, hereinafter, the position of the detection point 206 may be deemed as the position of the finger 900 of the user.

As represented by dashed-two-dotted lines in FIG. 7, the user first touches a part above the uncontrol area 202 in the detection area 200, then moves the finger 900 to a part below the uncontrol area 202 such that the finger 900 passes through the uncontrol area 202 as represented by the arrow in FIG. 7.

When the operation illustrated in FIG. 7 is performed, the information processing apparatus 100 according to the present disclosure does not control (scroll) the application while the detection point 206 is located above the uncontrol area 202. Next, control of the application starts when the detection point 206 enters the uncontrol area 202 once (indicated by P1 in FIG. 7) and then the detection point 206 passes through the uncontrol area 202 (indicated by P2 in FIG. 7).

Figure 8:
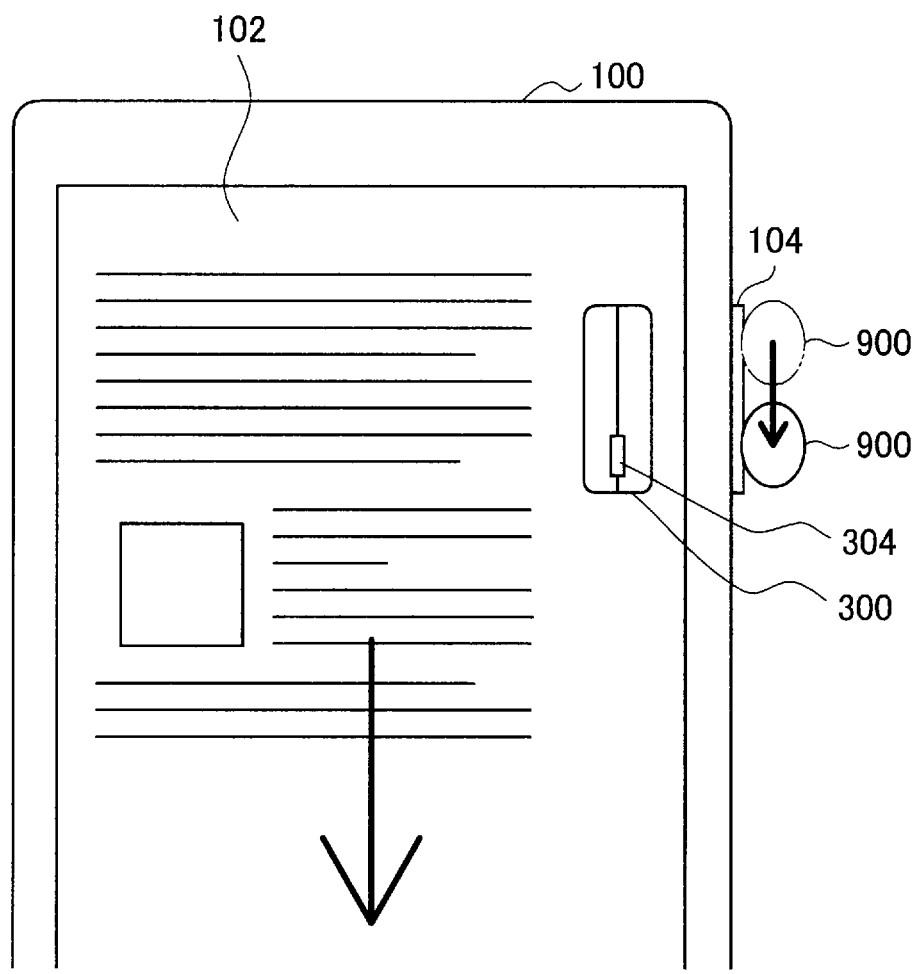
FIG. 8 is a diagram illustrating an example of control of scrolling in the information processing apparatus according to the embodiment of the present disclosure.

Therefore, in the case where the finger 900) moves as illustrated in FIG. 7, an image displayed on the display unit 102 is scrolled down as illustrated in FIG. 8 when the detection point 206 passes through the uncontrol area 202. In other words, by scrolling down the image, the display range is changed to a downward direction of a content (such as a web page) displayed on the display unit 102. In addition, the scrolling may continue until the user removes the finger 900 from the fingerprint sensor 104 or until the user moves the finger 900 to the uncontrol area 202 as described later. Note that, as illustrated in FIG. 8, the cursor 302 moves downward in the positional display 300 in response to the finger 900 of the user moving downward.

Figure 9:
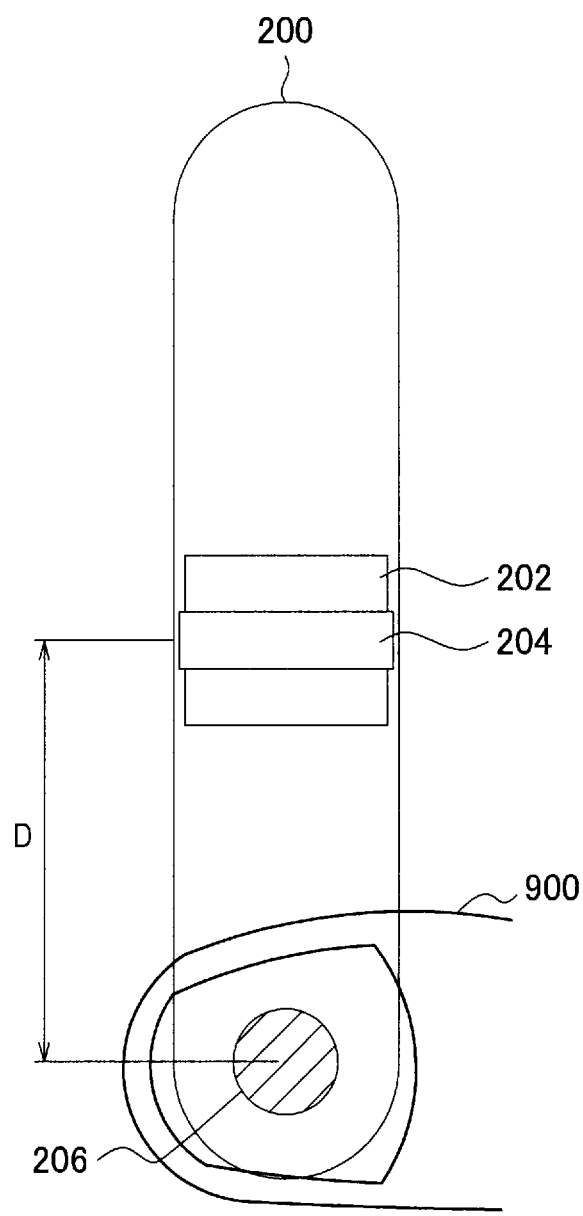
FIG. 9 is a diagram illustrating an example of an operation method of the information processing apparatus according to the embodiment of the present disclosure.

In addition, as illustrated in FIG. 9, in the case where the user further moves the finger 900 downward, speed of the scrolling may be changed in accordance with a distance D between the central part 204 and the detection point 206. For example, the speed of scrolling may be calculated by multiplying the distance between the central part 204 and the detection point 206 by a constant. In other words, the speed of scrolling may get faster in proportion to the distance between the central part 204 and the detection point 206. Accordingly, in the case where the user moves the finger 900 from the position illustrated in FIG. 7 to the position illustrated in FIG. 9, speed of scrolling in the state illustrated in FIG. 9 gets faster than speed of scrolling in the state illustrated in FIG. 7.

In the case where the scrolling is controlled as described above, the maximum scrolling speed of scrolling is obtained when the user moves the finger 900 to a lowermost part in the detection area 200. In addition, at this time, the cursor 304 also moves to a lowermost part in the positional display 300 illustrated in FIG. 8. In addition, a threshold may be set for the speed of scrolling such that the scrolling with speed that is equal to or more than the threshold is not allowed. In addition, speed display that represents the speed of scrolling may be displayed in addition to or instead of the positional display 300. In the case where a threshold related to speed of scrolling is set as described above, the cursor 304 may move to an upper end or a lower end in the speed display when the speed of scrolling reaches the threshold.

Figure 10:
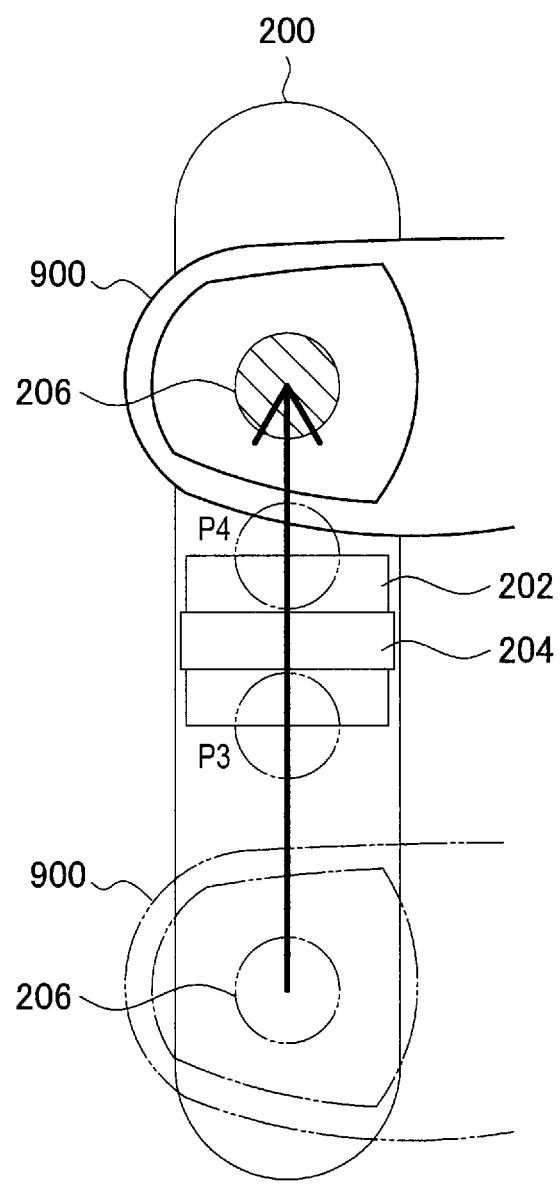
FIG. 10 is a diagram illustrating an example of an operation method of the information processing apparatus according to the embodiment of the present disclosure.

Next, as illustrated in FIG. 10, in the case where the user moves the finger 900 in an upward direction from the position illustrated in FIG. 7, scrolling stops when the detection point 206 enters the uncontrol area 202 (indicated by P3 in FIG. 10). Accordingly, when the user wants to stop scrolling, it is possible for the user to quickly stop scrolling by moving the finger 900 to the uncontrol area 202. Scrolling in the upward direction starts when the user further moves the finger 900 in the upward direction and the detection point 206 gets out of the uncontrol area 202 (indicated by P4 in FIG. 10). In this case, speed of the scrolling may get faster in accordance with the distance between the central part 204 and the detection point 206 when the user further moves the finger 900 upwards, in a way similar to the above-described case.

Note that, in the above-described example, the downward scrolling is carried out in the case where the detection point 206 is located below the uncontrol area 202, and the upward scrolling is carried out when the detection point 206 is located above the uncontrol area 202. However, directions of scrolling may be opposite to the positional relations between the detection point 206 and the uncontrol area 202. In other words, the upward scrolling may be carried out in the case where the detection point 206 is located below the uncontrol area 202, and the downward scrolling may be carried out when the detection point 206 is located above the uncontrol area 202.

In addition, the application may be controlled in different ways corresponding to states of the application. For example, in the case where the application is a browser and a state of the application indicates a state in which an uppermost part of a web page is displayed, it is impossible to scroll the web page upward. Therefore, the scrolling control may be limited to downward scrolling control.

In addition, in the case where the state of the application indicates a state in which the uppermost part of the web page is displayed, it is possible to dynamically moves positions of the central part 204 and the uncontrol area 202 downwards in the detection area 200. Therefore, the detection point 206 is spuriously recognized as being located above the central part 204 when the user touches the fingerprint sensor 104. Accordingly, the user easily scrolls down the web page.

In addition, the application may be controlled in different ways corresponding to details of contents displayed by the application. For example, the application may be controlled in different ways corresponding to lengths of displayed web pages. In this case, speed of scrolling may get faster when the application displays a long web page, and speed of scrolling may get slower when the application displays a short web page.

The example of controlling scrolling in the application that displays an image has been described above. However, control of the application is not limited thereto. For example, in addition to control of scrolling, zooming of a display screen may be controlled as control for changing a display range of a display screen. In this case, for example, control of scrolling in the upward direction under the scrolling control corresponds to control for enlarging a display screen, and control of scrolling in the downward direction under the scrolling control corresponds to control for shrinking the display screen. In addition, the above-described control of changing speed of scrolling may correspond to control of changing speed of enlarging or shrinking the display screen.

In addition, in the case where zooming of the display screen is controlled, the application may be controlled in different ways corresponding to sizes of contents to be displayed. For example, in the case where a large image is displayed by the application, speed of enlarging or shrinking the display screen may get faster. Alternatively, in the case where a small image is displayed, speed of enlarging or shrinking the display screen may get slower.

In addition, the application may be an application that reproduces a moving image. In this case, for example, control of scrolling in the upward direction under the scrolling control corresponds to control for fast forwarding the moving image, and control of scrolling in the downward direction under the scrolling control corresponds to control for rewinding the moving image. In addition, the above-described control of changing speed of scrolling may correspond to control of changing speed of fast-forwarding or rewinding the moving image.

In addition, in the case where the application is an application that reproduces a moving image, the application may be controlled in different ways corresponding to lengths of videos to be reproduced. For example, in the case where the application reproduces a long moving image, speed of fast-forwarding or rewinding the moving image may get faster. Alternatively, in the case where the application reproduces a short moving image, speed of fast-forwarding or rewinding the moving image may get slower.

In addition, the application may be an application that reproduces sound. In this case, for example, control of scrolling in the upward direction under the scrolling control may correspond to control for increasing a sound volume, and control of scrolling in the downward direction under the scrolling control may correspond to control for lowering the sound volume. In addition, the above-described control of changing speed of scrolling may correspond to control of changing speed of increasing or lowering the sound volume.

As described above, the information processing apparatus 100 according to the present disclosure controls an application in accordance with a positional relation between the uncontrol area 202 and a detected position of a contact body. According to such a configuration, it is possible for the user to operate an application by using operation methods with high operability.

In addition, by preparing the uncontrol area 202, it is possible to prevent small operation from being repeated. The small operation is performed on the application without user's intention. For example, in the case of scrolling, small scrolling in the vertical direction is repeated without user's intention. By preparing the uncontrol area 202, it is possible to prevent such small operation from being repeated without user's intention. In addition, it is possible for the user to immediately stop operating the application by moving the finger 900 into the uncontrol area 202.

In addition, as described above, the fingerprint sensor 104 may be pushable. It is possible to continue controlling the running application by pushing the fingerprint sensor 104 while controlling the application. In other words, in the case where scrolling is controlled and the user pushes the fingerprint sensor 104 while the scrolling is controlled, it is possible to continue the scrolling control even when the user removes the finger 900 from the fingerprint sensor 104.

In addition, in the case where the user pushes the fingerprint sensor 104 and then moves the finger 900 up and down, it is possible to perform control that is different from control performed when the detection point 206 passes through the uncontrol area 202 as described above. For example, in the case where the control performed when the detection point 206 passes through the uncontrol area 202 is scrolling, it is possible to perform control such as the screen capturing when the user pushes the fingerprint sensor 104 and then moves the finger 900 up and down. The control is different from the scrolling.

4. Process Example in Information Processing Apparatus

Figure 11:
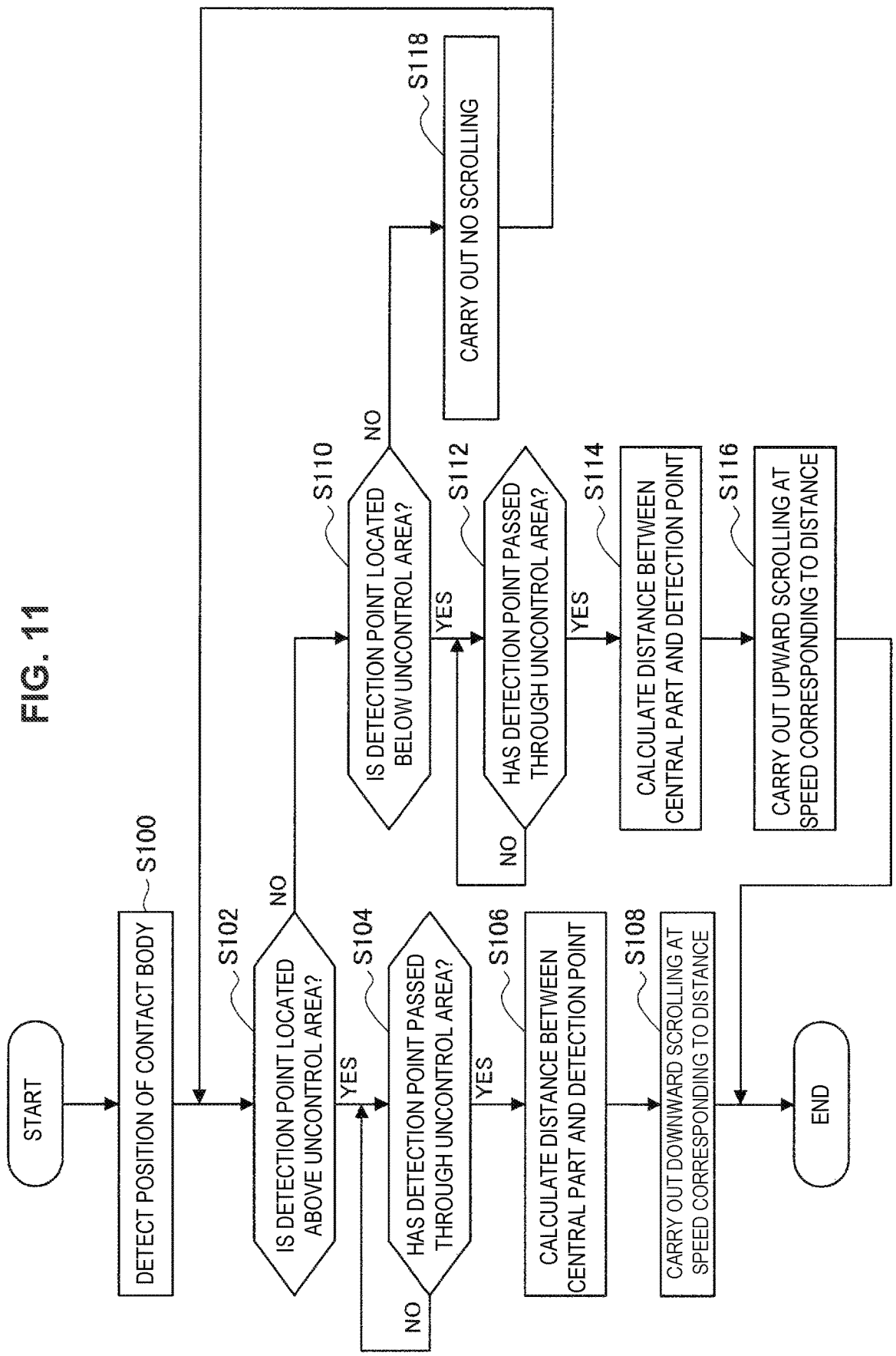
FIG. 11 is a diagram illustrating an example of a process executed in the information processing apparatus according to the embodiment of the present disclosure.

The operation method performed in the information processing apparatus 100 according to the present disclosure has been described above. Next, a processing example in the information processing apparatus 100 according to the present disclosure will be described. FIG. 11 is a diagram illustrating a process performed when scrolling is carried out on the information processing apparatus 100.

First, in Step S100, the fingerprint sensor 104 detects the position of the finger 900 that is the contact body. Next, in Step S102, the control information generation unit 110 determines whether or not the detection point 206 is located above the uncontrol area 202 on the basis of the detection point 206 of the finger 900 detected by the fingerprint sensor 104. The process proceeds to Step S104 when the control information generation unit 110 determines that the detection point 206 is located above the uncontrol area 202 in Step S102.

In Step S104, the control information generation unit 110 determines whether or not the detection point 206 has passed through the uncontrol area 202. When the control information generation unit 110 recognizes that the detection point 206 has passed through the uncontrol area 202 in Step S104, the control information generation unit 110 calculates a distance between the central part 204 of the detection area 200 and the detection point 206 in Step S106. Next, in Step S108, the control information generation unit 110 generates control information for downward scrolling at a speed corresponding to the distance calculated in Step S106, and sends the control information to the processing unit 112. The processing unit 112 that has received the control information controls an application on the basis of the control information, such that the downward scrolling is carried out.

The process proceeds to Step S110 when the control information generation unit 110 determines that the detection point 206 is not located above the uncontrol area 202 in Step S102. Next, in Step S110, the control information generation unit 110 determines whether or not the detection point 206 is located below the uncontrol area 202. The process proceeds to Step S112 when the control information generation unit 110 determines that the detection point 206 is located below the uncontrol area 202 in Step S110.

In Step S112, the control information generation unit 110 determines whether or not the detection point 206 has passed through the uncontrol area 202. When the control information generation unit 110 recognizes that the detection point 206 has passed through the uncontrol area 202 in Step S112, the control information generation unit 110 calculates a distance between the central part 204 of the detection area 200 and the detection point 206 in Step S114. Next, in Step S116, the control information generation unit 110 generates control information for upward scrolling at a speed corresponding to the distance calculated in Step S114, and sends the control information to the processing unit 112. The processing unit 112 that has received the control information controls an application on the basis of the control information, such that the upward scrolling is carried out.

When the control information generation unit 110 determines that the detection point 206 is not located below the uncontrol area 202 in Step S110, the control information generation unit 110 recognizes that the detection point 206 is in the uncontrol area 202, and the process proceeds to Step S118. In Step S118, since the detection point 206 is in the uncontrol area 202, the control information generation unit 110 does not generate control information or the control information generation unit 110 sends, to the processing unit 112, control information instructing not to control the application. Since the process proceeds as described above, scrolling is not carried out in Step S118.

5. Another Configuration of Information Processing Apparatus

The configurations of the respective units of the information processing apparatus 100 and the process example of the information processing apparatus 100 according to the present disclosure have been described above. Next, an example of another configuration of the information processing apparatus 100 according to the present disclosure will be described.

<5-1. Feedback Using Vibration Device>

The information processing apparatus 100 according to the present disclosure may haptically feed back to the user by using the vibration device 116 when the detection point 206 enters the uncontrol area 202 or when the detection point 206 gets out of the uncontrol area 202. For example, when the control information generation unit 110 recognizes that the detection point 206 has entered the uncontrol area 202 or the detection point 206 has gotten out of the uncontrol area 202, the processing unit 112 sends an instruction to the vibration control unit 114 to operate the vibration device 116. In addition, the vibration device 116 may be operated especially when the application is controlled or when control of the application is changed. Therefore, it is possible for the user to haptically recognize that the application is operated or operation of the application is changed.

Figure 12:
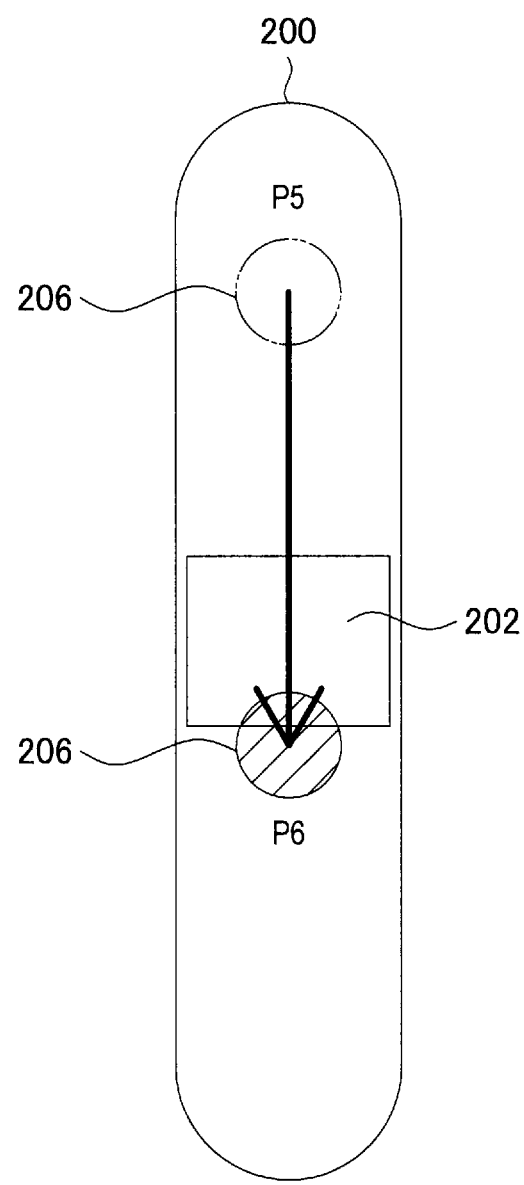
FIG. 12 is a diagram illustrating an example of a timing of activating a vibration device in the information processing apparatus according to the embodiment of the present disclosure.

FIG. 12 is a diagram illustrating an example of a timing of activating the vibration device 116 in the information processing apparatus 100. As represented by the dashed-two-dotted line in FIG. 12, the user first touches a part above the uncontrol area 202 (indicated by P5 in FIG. 12). Next, the vibration device 116 operates and vibration is generated when the detection point 206 enters the uncontrol area 202 once and the detection point 206 gets out of the uncontrol area 202 (when the detection point 206 is located at P6). At this time, downward scrolling starts as described above.

Figure 13:
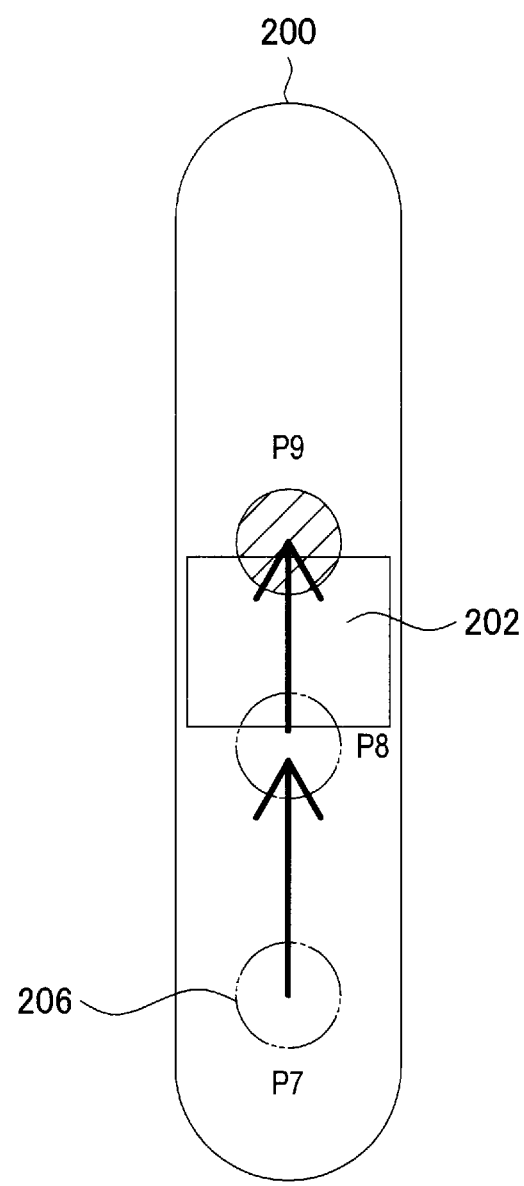
FIG. 13 is a diagram illustrating an example of a timing of activating the vibration device in the information processing apparatus according to the embodiment of the present disclosure.

In addition, after the situation illustrated in FIG. 12, the vibration device 116 operates and vibration is generated when the detection point 206 moves to a position P7 and then the detection point 206 enters the uncontrol area 202 (when the detection point 206 is located at P8) as illustrated in FIG. 13. At this time, the scrolling stops as described above.

In addition, the vibration device 116 operates and vibration is generated again when the user further moves the finger 900 and the detection point 206 gets out of the uncontrol area 202 (when the detection point 206 is located at a position P9). At this time, upward scrolling starts as described above. Note that, no vibration is preferably generated when the detection point 206 enters the uncontrol area 202 for the first time (when the detection point 206 enters the uncontrol area 202 for the first time in FIG. 12), since the application is not controlled and control of the application is not changed.

As described above, the vibration device 116 vibrates when the detection point 206 enters or gets out of the uncontrol area 202. Accordingly, vibration is generated at a timing when control of the application is started or changed. Therefore, the user becomes capable of recognizing the timing when control of the application is changed, from the vibration. This enables improving operability.

In addition, the vibration of different intensities may be generated between the case where the detection point 206 enters the uncontrol area 202 and the case where the detection point 206 gets out of the uncontrol area 202. For example, the intensity of vibration generated when the detection point 206 enters the uncontrol area 202 may be stronger than the intensity of the vibration generated when the detection point 206 gets out of the uncontrol area 202. As described above, since the intensity of vibration can be changed, it is possible for the user to recognize a start of control of an application and a stop of control of the application from the intensities of vibration.

<5-2. Detection of Movement of Detection Point in Lateral Direction (Short Side Direction)>

The example of feedback using the vibration device 116 has been described above. Next, an example of detecting movement of the detection point 206 in a lateral direction (short side direction) in the detection area 200 will be described. As described above, the fingerprint sensor 104 according to the present disclosure is provided on a side surface of the information processing apparatus 100. Therefore, it is difficult for the user to visually recognize the position of the finger 900 on the fingerprint sensor 104 in the short side direction. Therefore, there is a possibility that the user erroneously removes the finger 900 from the fingerprint sensor 104. Accordingly, the information processing apparatus 100 according to the present disclosure causes the positional display 300 to display the position of the finger 900 in the short side direction in the detection area 200.

Figure 14:
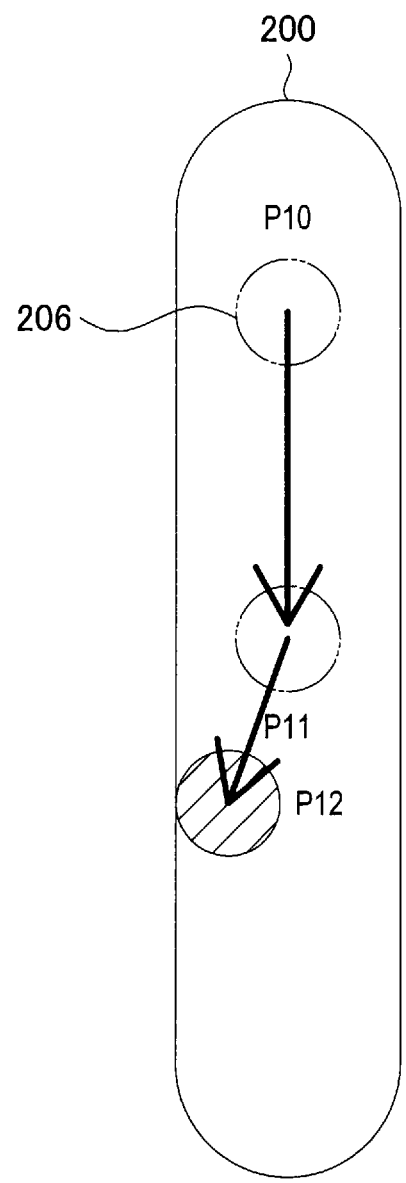
FIG. 14 is a diagram illustrating an example of detecting a position of a contact body in a short side direction of the fingerprint sensor according to the embodiment of the present disclosure.

FIG. 14 is a diagram illustrating an example in which the fingerprint sensor 104 detects the position of the finger 900 in the short side direction. As illustrated in FIG. 14, when the user moves the finger 900, it is detected that the detection point 206 moves from a position P10 to a position P11 and further moves to a position P12. In this case, the position P12 is a position deviated from the center of the detection area 200 in the short side direction.

Figure 15:
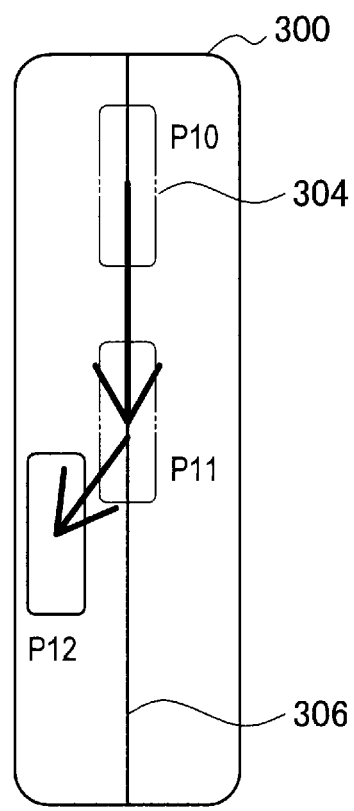
FIG. 15 is a diagram illustrating an example of detecting a position of the contact body in the short side direction of the fingerprint sensor according to the embodiment of the present disclosure.

FIG. 15 is a diagram illustrating the positional display 300 displayed when the detection point 206 is detected as illustrated in FIG. 14. As illustrated in FIG. 15, the cursor 304 is displayed in the positional display 300 such that the cursor 304 corresponds to the detection point 206 illustrated in FIG. 14. In other words, at the position P12, the cursor 304 is displayed at a position that is deviated from the center line 306 in the short side direction.

As described above, by displaying the cursor 304 corresponding to the position of the finger 900 in the short side direction of the fingerprint sensor 104, it is possible for the user to easily recognize that the finger 900 is almost removed from the fingerprint sensor 104.

Figure 16:
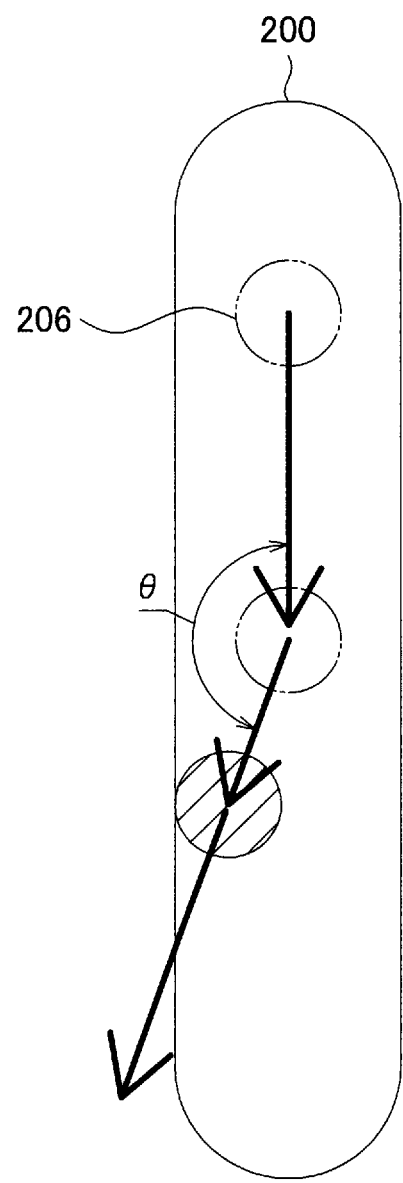
FIG. 16 is a diagram illustrating an example of detecting a position of the contact body in the short side direction of the fingerprint sensor according to the embodiment of the present disclosure.

In addition, as illustrated in FIG. 16, in the case where the user intentionally removes the finger 900 from the fingerprint sensor 104 in the short side direction, the control information generation unit 110 may recognize such movement as intentional operation. For example, in the case where the user performs such operation, automatic scrolling may be continued at scrolling speed obtained when the finger 900 is removed from the fingerprint sensor 104. In this case, the automatic scrolling stops when the user touches the display unit 102 or the fingerprint sensor 104.

As illustrated in FIG. 16, it may be determined whether or not the finger 900 is intentionally removed from the fingerprint sensor 104 on the basis of an angle (represented by θ in FIG. 16) of movement of the detection point 206 from the long side direction to the short side direction. For example, in the case where θ indicates a small angle such as 45°<θ<110°, the operation may be determined as intentional operation. Alternatively, in the case where θ indicates a large angle such as 110°<θ <180°, the operation may be determined as unintentional operation. As described above, the information processing apparatus 100 according to the present disclosure may determine whether or not to continue controlling the application on the basis of a movement locus (such as the above-described angle θ) of the finger 900 from the long side direction to the short side direction of the fingerprint sensor 104.

<5-3. Example in which Fingerprint Sensor has Circular Shape>

Figure 17:
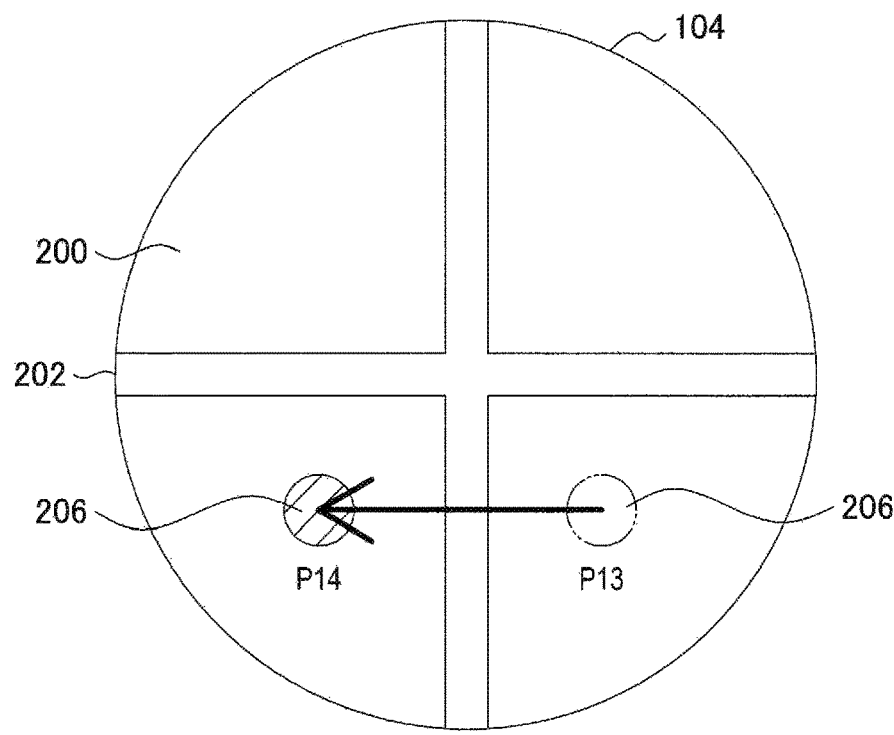
FIG. 17 is a diagram illustrating another example of the detection unit according to the embodiment of the present disclosure.

The information processing apparatus 100 that includes the fingerprint sensor 104 including the short side and the long side has been described above. Next, an example in which the fingerprint sensor 104 has a circular shape will be described. FIG. 17 is a diagram illustrating a configuration of a circular fingerprint sensor 104. Since the information processing apparatus 100 includes such a fingerprint sensor 104, it is possible for the information processing apparatus 100 to carry out scrolling in a lateral direction, as described later.

As illustrated in FIG. 17, in the case where the fingerprint sensor 104 has a circular shape, an uncontrol area 202 may have a cross shape. With regard to the fingerprint sensor 104 including such an uncontrol area 202, in the case where it is detected that the detection point 206 has passed through the uncontrol area 202 as illustrated in FIG. 17 and the detection point 206 has moved from a point P13 to a point P14, lateral scrolling may be carried out in the left direction in an application that displays a map, for example. In addition, in a way similar to the above-described scrolling in the upward and downward directions, speed of the lateral scrolling may be dynamically changed on the basis of a distance from the center of the uncontrol area 202 that extends in the vertical direction.

Figure 18:
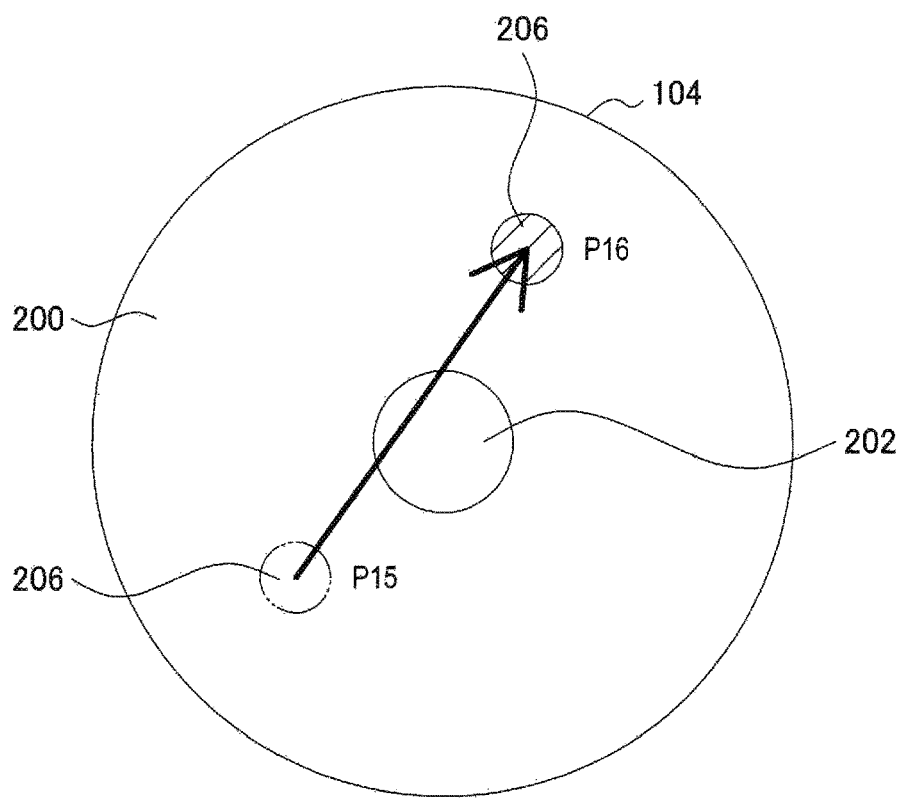
FIG. 18 is a diagram illustrating another example of the detection unit according to the embodiment of the present disclosure.

In addition, the uncontrol area 202 may have a circular shape as illustrated in FIG. 18. With regard to the fingerprint sensor 104 including such an uncontrol area 202, in the case where it is detected that the detection point 206 has passed through the uncontrol area 202 as indicated by the arrow illustrated in FIG. 18 and the detection point 206 has moved from a point P15 to a point P16, scrolling may be carried out in any direction to which the detection point 206 has moved in an application that displays a map, for example. In other words, in the case where the detection point 206 moves as illustrated in FIG. 18, the application that displays a map may be controlled such that scrolling may be carried out toward the upper right.

At this time, the scrolling direction may be decided on the basis of an initially-detected position of the detection point 206 (the position P15 in FIG. 18) and a current position of the detection point 206 (the position P16 in FIG. 18), for example. In addition, the scrolling direction may be decided on the basis of a position at which the detection point 206 gets out of the uncontrol area 202 and a current position of the detection point 206.

Figure 19:
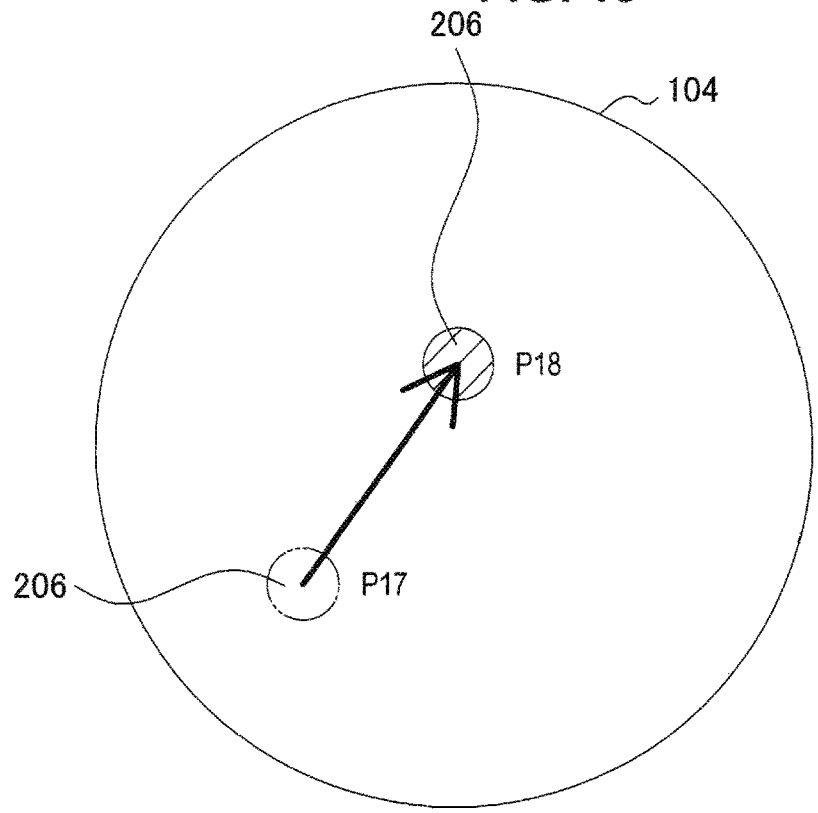
FIG. 19 is a diagram illustrating another example of the detection unit according to the embodiment of the present disclosure.
Figure 20:
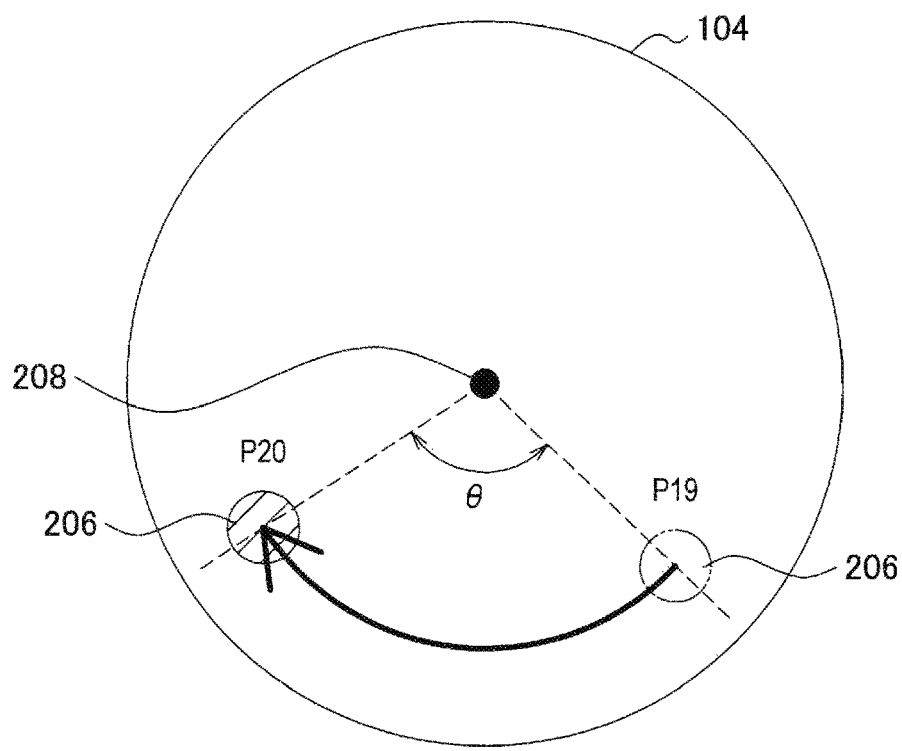
FIG. 20 is a diagram illustrating another example of the detection unit according to the embodiment of the present disclosure.

In addition, as illustrated in FIG. 19, the uncontrol area 202 does not have to be prepared. In this case, scrolling corresponding to a movement direction of the detection point 206 may start at a time when the detection point 206 moves a constant distance from an initial position of the detection point 206 (position P17) (when the detection point 206 is located at a position P18). In addition, as illustrated in FIG. 20, a rotation angle θ to a central point 208 may be calculated, and scrolling may be carried out at a scrolling speed or a scrolling distance corresponding to measure of the rotation angle.

6. Another Configuration Example of Information Processing Apparatus

The information processing apparatus 100 that includes the circular fingerprint sensor 104 has been described above. Next, another configuration example of the information processing apparatus 100 will be described.

Figure 21:
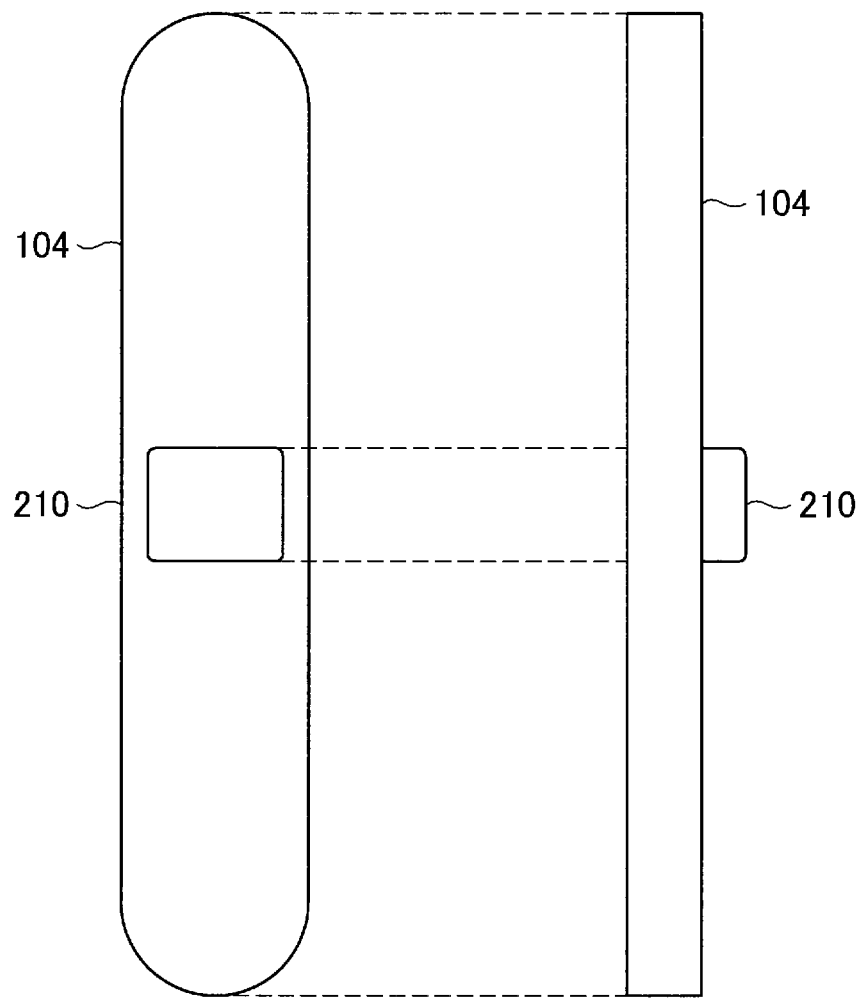
FIG. 21 is a diagram illustrating an example of a configuration in which the detection unit has a projection part according to the embodiment of the present disclosure.

For example, as illustrated in FIG. 21, a projection part 210 may be provided on the central part 204 of the fingerprint sensor 104 of the information processing apparatus 100 according to the present disclosure. As described above, when the projection part 210 is provided, it is possible for the user to perform operation more easily by using haptic information of a tip of his/her finger. Note that, as such a structural element provided on the central part 204 of the fingerprint sensor 104, a recessed part may be provided instead of the projection part 210. In addition, the number of the structural element provided on the central part 204 of the fingerprint sensor 104 is not limited to one. It is possible to provide a plurality of tiny structural elements.

Figure 22:
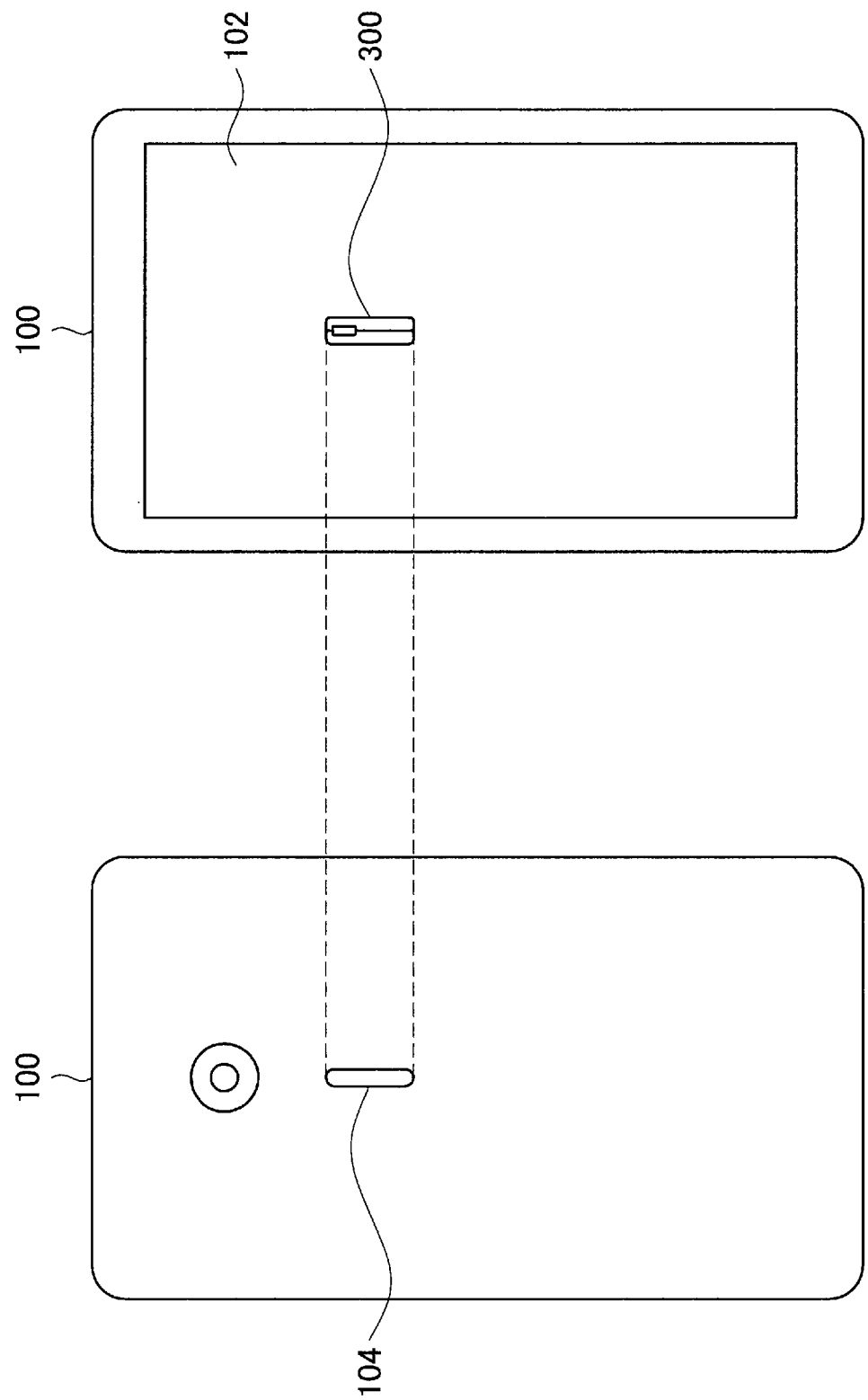
FIG. 22 is a diagram illustrating another arrangement example of the detection unit according to the embodiment of the present disclosure.

In addition, in the above-described examples, the fingerprint sensor 104 is provided on the side surface of the information processing apparatus 100. However, as illustrated in FIG. 22, the fingerprint sensor 104 may be provided on the back side of the information processing apparatus 100. At this time, the positional display 300 may be displayed such that the positional display 300 corresponds to the position of the fingerprint sensor 104 on the back side. In addition, as described above, the fingerprint sensor 104 is an example of the detection unit that detects a contact body. The detection unit may be formed by using a part of the area of the touchscreen 108.

Figure 23:
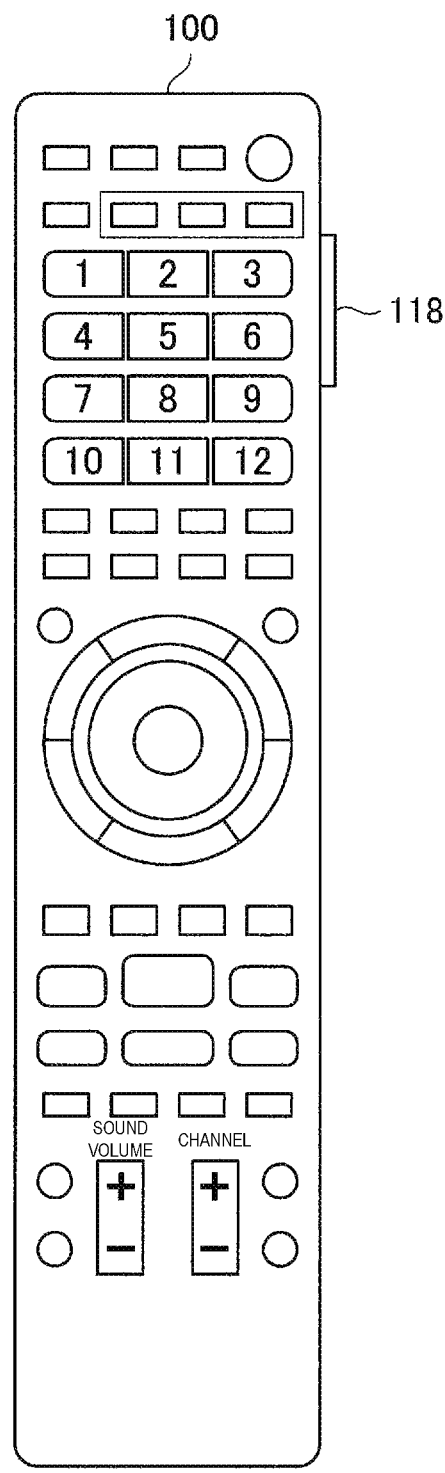
FIG. 23 is a diagram illustrating another example of the information processing apparatus according to the embodiment of the present disclosure.

In addition, in the above-described examples, the information processing apparatus 100 includes the processing unit 112 that executes applications. However, as illustrated in FIG. 23, the information processing apparatus 100 according to the present disclosure may be a remote control that does not include the processing unit 112 for executing applications. In this case, the information processing apparatus 100 is an example of the control information generation unit 110 and the detection unit. The information processing apparatus 100 may include an operation unit 118 corresponding to the above-described fingerprint sensor 104, and may transmit control information to another information terminal.

Figure 24:
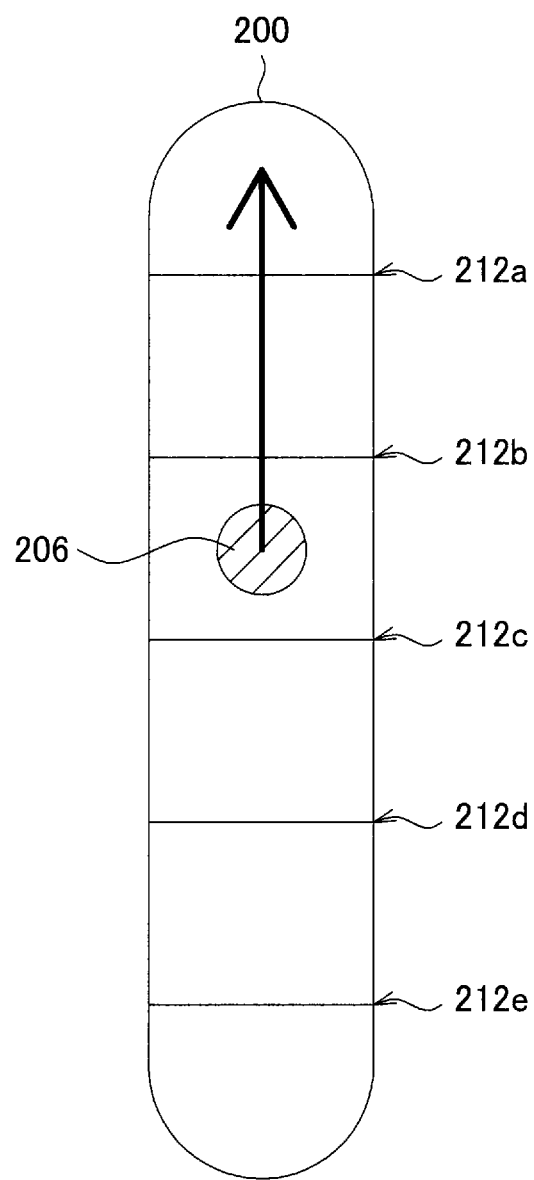
FIG. 24 is a diagram illustrating another example of the detection unit according to the embodiment of the present disclosure.

In addition, as illustrated in FIG. 24, the information processing apparatus 100 may be configured such that a plurality of thresholds (represented by 212*a* to 212*e* in FIG. 24) is set in the detection area 200 and an application is controlled each time the detection point 206 passes through one of the thresholds. Such a configuration enables the user to perform operation as if the user used a jog dial.

7. Supplement

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the case where the fingerprint sensor 104 also serves as another function such as a power button, in order to be distinguished from the other function, the information processing apparatus 100 according to the present disclosure may be configured such that the positional display 300 is displayed after a predetermined period of time has passed since the user has touched the fingerprint sensor 104, and then control of an application is enabled.

In addition, in the above-described examples, an application is controlled on the basis of a positional relation between the detection point 206 and the uncontrol area 202. However, it is also possible to start controlling an application in the case where a detection point 206 moves a constant distance or more from a detection point 206 obtained when the user has initially touched the fingerprint sensor 104.

In addition, the control information generation unit 110 and the processing unit 112 described above may be implemented by using a general-purpose processor. In addition, it may be possible to provide a computer program for causing the processor to operate as described above. Moreover, it may be possible to provide a storage medium having the computer program stored therein.

8. Conclusion

As described above, the information processing apparatus 100 according to the present disclosure controls an application in accordance with a positional relation between the uncontrol area 202 and a detected position of a contact body. According to such a configuration, it is possible for the user to operate an application by using operation methods with high operability.

In addition, by preparing the uncontrol area 202, it is possible to prevent small operation from being repeated. The small operation is performed on the application without user's intention. In addition, it is possible for the user to immediately stop operating the application by moving the finger 900 into the uncontrol area 202. In addition, it is also possible to change a way of controlling the application in accordance with a distance between the central part 204 in the detection area 200 and a detected position of a contact body. Such a configuration enables the user to change the way of controlling the application through simple operation.

Additionally, the present technology may also be configured as below.

(1)
 An information processing apparatus including:
 a detection unit that has a detection area for detecting a position of a contact body; and
 a control information generation unit that generates control information regarding an application,
 in which the detection area includes an uncontrol area for preventing the application from being controlled when the contact body comes into contact, and
 the control information generation unit generates the control information regarding the application on the basis of a positional relation between the uncontrol area and a position of the contact body detected by the detection unit in the detection area.

(2)
 The information processing apparatus according to (1),
 in which the control information generation unit generates the control information regarding the application on a basis that the detection unit has detected that the contact body has passed through the uncontrol area.

(3)
 The information processing apparatus according to (1) or (2),
 in which the application is an application that displays an image.

(4)
 The information processing apparatus according to (3),
 in which the control information regarding the application generated by the control information generation unit is control information for changing a display range of a display image displayed on a display unit.

(5)
 The information processing apparatus according to (4),
 in which control information for changing a display range of a display screen displayed on the display unit is control information related to scrolling of the display screen.

(6)
 The information processing apparatus according to (5),
 in which the control information generation unit generates control information such that speed of the scrolling is changed in accordance with a distance between a central part of the detection area and a position of the contact body detected by the detection unit in the detection area.

(7)
 The information processing apparatus according to (4),
 in which control information for changing a display range of a display screen displayed on the display unit is zooming of the display screen.

(8)
 The information processing apparatus according to any one of (2) to (7),
 in which the control information generation unit generates different control information in accordance with states of the application.

(9)
 The information processing apparatus according to any one of (1) to (8),
 in which the uncontrol area is in a center of the detection area.

(10)
 The information processing apparatus according to any one of (1) to (9),
 in which the detection unit is a hardware key.

(11)
 The information processing apparatus according to (10),
 in which the hardware key has a projection part or a recessed part.

(12)
The information processing apparatus according to (10) or (11),
in which the detection unit is a fingerprint sensor.

(13)
The information processing apparatus according to any one of (10) to (12), in which
the hardware key is pushable, and
the control information generation unit generates control information related to control on a basis that the hardware key has been pushed and the contact body has passed through the uncontrol area, the control being different from control performed when the contact body has passed through the uncontrol area.

(14)
The information processing apparatus according to any one of (2) to (13), further including
a display control unit that controls a display unit,
in which the display control unit causes the display unit to display position display related to a position of the contact body detected by the detection unit in the detection area.

(15)
The information processing apparatus according to (14),
in which the display control unit causes the display unit to display assistive display near the positional display for assisting user operation.

(16)
The information processing apparatus according to any one of (1) to (15), further including
a vibration control unit that controls a vibration device, and
the vibration control unit vibrates the vibration device in a case where the detection unit has detected that the contact body has entered the uncontrol area or the control body has gotten out of the uncontrol area.

(17)
The information processing apparatus according to (16),
in which the vibration control unit uses different vibration methods of the vibration device between the case where the detection unit has detected that the contact body has entered the uncontrol area and the case where the detection unit has detected that the contact body has gotten out of the uncontrol area.

(18)
The information processing apparatus according to any one of (2) to (17), in which
the detection unit has a long side and a short side,
the detection unit detects that the contact body has come out of the detection area, and
the control information generation unit determines whether or not to continue controlling the application on the basis of a movement locus of the contact body from the long side to the short side of the detection unit.

(19)
A program causing a processor to:
cause a detection unit that has a detection area to detect a position of a contact body; and
generate control information regarding an application,
in which the detection area includes an uncontrol area for preventing the application from being controlled when the contact body comes into contact, and
the program further causes the processor to generate the control information regarding the application on the basis of a positional relation between the uncontrol area and a position of the contact body detected by the detection unit in the detection area.

(20)
An information processing system including:
a detection unit that has a detection area for detecting a position of a contact body; and
a control information generation unit that generates control information regarding an application,
in which the detection area includes an uncontrol area for preventing the application from being controlled when the contact body comes into contact, and
the control information generation unit generates the control information regarding the application on the basis of a positional relation between the uncontrol area and a position of the contact body detected by the detection unit in the detection area.

REFERENCE SIGNS LIST 100 information processing apparatus
102 display unit
104 fingerprint sensor
106 display control unit
108 touchscreen
110 control information generation unit
112 processing unit
114 vibration control unit
116 vibration device
200 detection area
202 uncontrol area
204 central part
206 detection point
210 projection part
300 positional display
302 assistive display
304 cursor
306 center line
900 finger

The invention claimed is:

1. An information processing apparatus comprising:
a detection unit that has a detection area for detecting a position of a contact body; and
a control information generation unit that generates control information regarding an application,
wherein the detection area includes an uncontrol area for preventing the application from being controlled when the contact body comes into contact, and
the control information generation unit generates the control information regarding the application on a basis of a positional relation between the uncontrol area and a position of the contact body detected by the detection unit in the detection area.

2. The information processing apparatus according to claim 1,
wherein the control information generation unit generates the control information regarding the application on a basis that the detection unit has detected that the contact body has passed through the uncontrol area.

3. The information processing apparatus according to claim 1,
wherein the application is an application that displays an image.

4. The information processing apparatus according to claim 3,
wherein the control information regarding the application generated by the control information generation unit is control information for changing a display range of a display image displayed on a display unit.

5. The information processing apparatus according to claim 4, wherein control information for changing a display range of a display screen displayed on the display unit is control information related to scrolling of the display screen.

6. The information processing apparatus according to claim 5,
wherein the control information generation unit generates control information such that speed of the scrolling is changed in accordance with a distance between a central part of the detection area and a position of the contact body detected by the detection unit in the detection area.

7. The information processing apparatus according to claim 4,
wherein control information for changing a display range of a display screen displayed on the display unit is zooming of the display screen.

8. The information processing apparatus according to claim 2,
wherein the control information generation unit generates different control information in accordance with states of the application.

9. The information processing apparatus according to claim 1,
wherein the uncontrol area is in a center of the detection area.

10. The information processing apparatus according to claim 1,
wherein the detection unit is a hardware key.

11. The information processing apparatus according to claim 10,
wherein the hardware key has a projection part or a recessed part.

12. The information processing apparatus according to claim 10,
wherein the detection unit is a fingerprint sensor.

13. The information processing apparatus according to claim 10, wherein
the hardware key is pushable, and
the control information generation unit generates control information related to control on a basis that the hardware key has been pushed and the contact body has passed through the uncontrol area, the control being different from control performed when the contact body has passed through the uncontrol area.

14. The information processing apparatus according to claim 2, further comprising
a display control unit that controls a display unit,
wherein the display control unit causes the display unit to display position display related to a position of the contact body detected by the detection unit in the detection area.

15. The information processing apparatus according to claim 14,
wherein the display control unit causes the display unit to display assistive display near the positional display for assisting user operation.

16. The information processing apparatus according to claim 1, further comprising
a vibration control unit that controls a vibration device, and
the vibration control unit vibrates the vibration device in a case where the detection unit has detected that the contact body has entered the uncontrol area or the control body has gotten out of the uncontrol area.

17. The information processing apparatus according to claim 16,
wherein the vibration control unit uses different vibration methods of the vibration device between the case where the detection unit has detected that the contact body has entered the uncontrol area and the case where the detection unit has detected that the contact body has gotten out of the uncontrol area.

18. The information processing apparatus according to claim 2, wherein
the detection unit has a long side and a short side,
the detection unit detects that the contact body has come out of the detection area, and
the control information generation unit determines whether or not to continue controlling the application on a basis of a movement locus of the contact body from the long side to the short side of the detection unit.

19. A program causing a processor to:
cause a detection unit that has a detection area to detect a position of a contact body; and
generate control information regarding an application,
wherein the detection area includes an uncontrol area for preventing the application from being controlled when the contact body comes into contact, and
the program further causes the processor to generate the control information regarding the application on a basis of a positional relation between the uncontrol area and a position of the contact body detected by the detection unit in the detection area.

20. An information processing system comprising:
a detection unit that has a detection area for detecting a position of a contact body; and
a control information generation unit that generates control information regarding an application,
wherein the detection area includes an uncontrol area for preventing the application from being controlled when the contact body comes into contact, and
the control information generation unit generates the control information regarding the application on a basis of a positional relation between the uncontrol area and a position of the contact body detected by the detection unit in the detection area.

* * * * *